United States Patent
Brady et al.

(10) Patent No.: US 6,535,175 B2
(45) Date of Patent: Mar. 18, 2003

(54) ADJUSTABLE LENGTH ANTENNA SYSTEM FOR RF TRANSPONDERS

(75) Inventors: Michael John Brady, Brewster, NY (US); Thomas Anthony Cofino, Rye, NY (US); Dah-Weih Duan, Yorktown Heights, NY (US); Daniel J. Friedman, Tarrytown, NY (US); Harley Kent Heinrich, Brewster, NY (US); Venkata S. R. Kodukula, Yorktown Heights, NY (US); Michael Brent Madrid, Albuquerque, NM (US); Paul Andrew Moskowitz, Yorktown Heights, NY (US); Philip Murphy, New Fairfield, CT (US); Michael Louis Pinch, Albuquerque, NM (US); Dale Larry Scott, Albuquerque, NM (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/765,800

(22) Filed: Jan. 19, 2001

(65) Prior Publication Data

US 2002/0003496 A1 Jan. 10, 2002

Related U.S. Application Data

(63) Continuation-in-part of application No. 09/585,229, filed on Jun. 1, 2000, now abandoned.

(51) Int. Cl.[7] ............................ H01Q 9/28; G08B 13/14
(52) U.S. Cl. ........................ 343/795; 343/815; 343/745; 340/572.7
(58) Field of Search ..................... 343/703, 815, 343/817, 818, 745, 749, 795; 340/572.1, 572.7

(56) References Cited

U.S. PATENT DOCUMENTS

| | | | | |
|---|---|---|---|---|
| 4,763,074 A | * | 8/1988 | Fox ............................ 324/314 |
| 4,782,345 A | | 11/1988 | Lendt ......................... 343/727 |
| 4,786,907 A | | 11/1988 | Koelle ......................... 342/51 |
| 4,816,839 A | | 3/1989 | Landt ......................... 343/795 |
| 6,028,564 A | * | 2/2000 | Duan et al. ................. 343/818 |
| 6,121,880 A | * | 9/2000 | Scott et al. .............. 340/572.5 |
| 6,147,606 A | * | 11/2000 | Duan ....................... 340/572.7 |
| 6,249,227 B1 | * | 6/2001 | Brady et al. ............. 340/572.1 |
| 6,275,157 B1 | * | 8/2001 | Mays et al. .............. 340/572.5 |
| 6,285,342 B1 | * | 9/2001 | Brady et al. ................ 343/895 |

* cited by examiner

*Primary Examiner*—Tan Ho
(74) *Attorney, Agent, or Firm*—O'Melveny & Myers LLP

(57) ABSTRACT

The present invention provides an RF tag having an antenna that can be selectively tuned to achieve optimal performance. The RF tag comprises an RF transponder integrated circuit and an antenna connected to the RF transponder integrated circuit. The antenna includes components such as tuning stubs and loading bars that are physically alterable to selectively vary the performance characteristics of the antenna. The tuning stub and loading bar may each further comprising a variably selectable length having elements that may be removed by punching, cutting, etching, laser trimming or other process. The antenna may further comprise a leadframe or a flexible substrate.

19 Claims, 3 Drawing Sheets

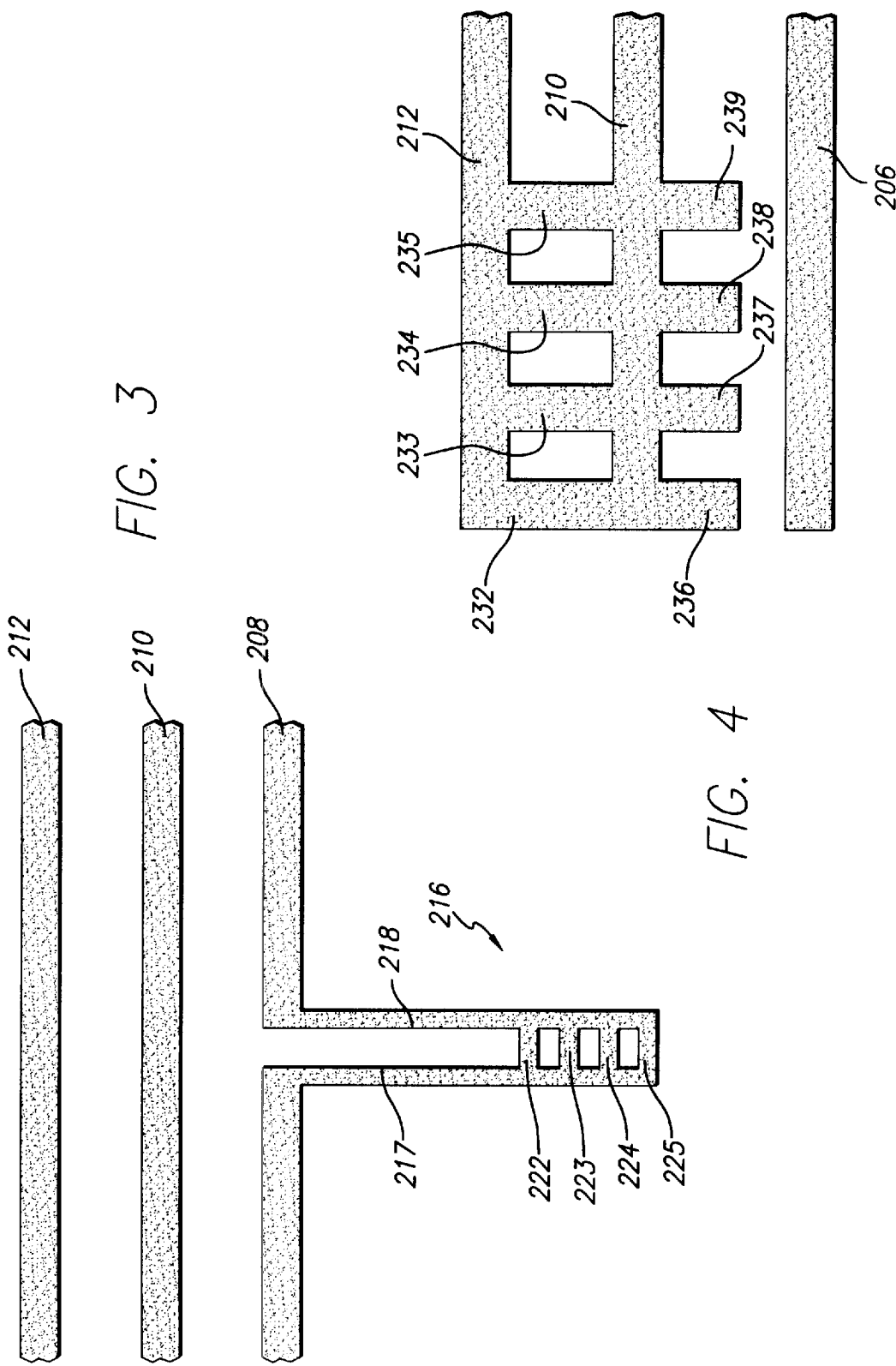

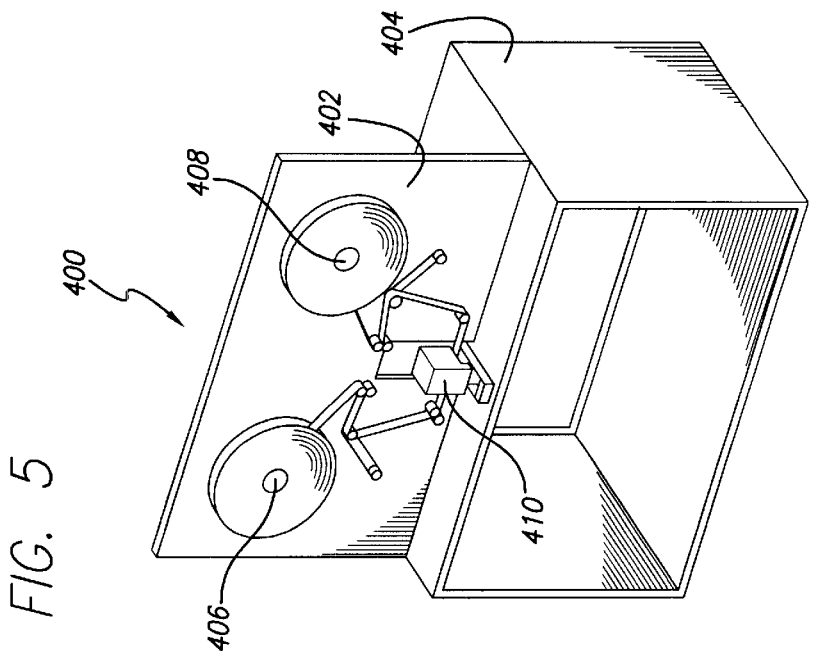
FIG. 5
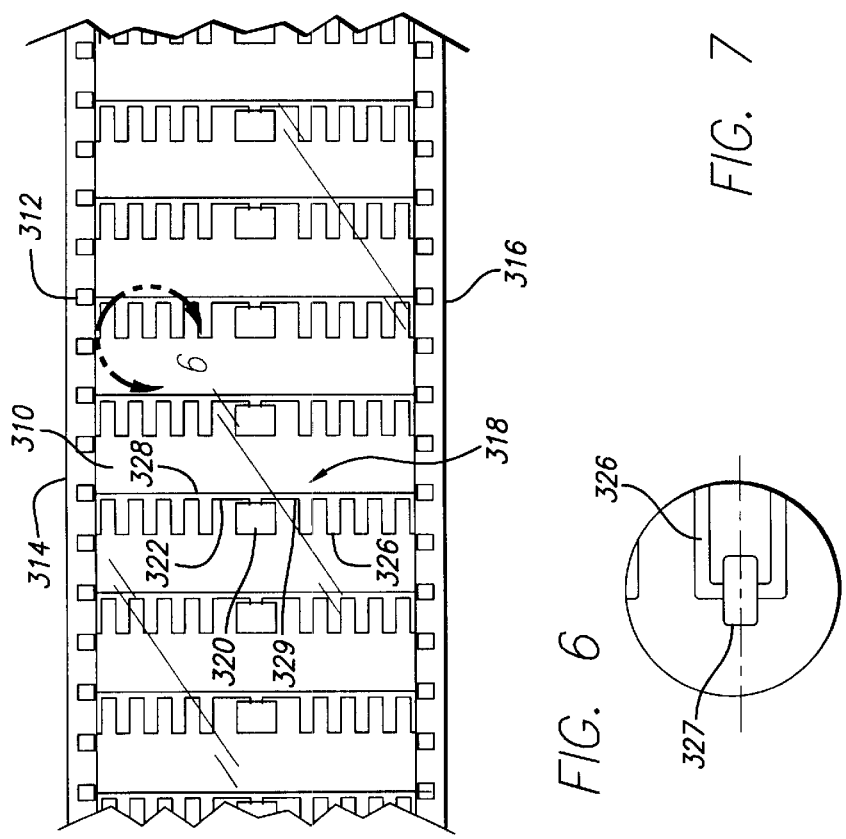
FIG. 6
FIG. 7

ADJUSTABLE LENGTH ANTENNA SYSTEM FOR RF TRANSPONDERS

RELATED APPLICATION

This is a continuation-in-part of co-pending application Ser. No. 09/585,229, filed Jun. 1, 2000, for ADJUSTABLE LENGTH ANTENNA SYSTEM FOR RF TRANSPONDERS, now abandoned.

BACKGROUND OF THE INVENTION

1. Field of the Invention

The present invention relates to radio frequency identification (RFID) systems. More particularly, the invention relates to a tag containing an RFID transponder having an antenna that can be adjusted or tuned to achieve optimal performance characteristics.

2. Description of Related Art

Radio frequency transponders are used in many applications. In the automatic data identification industry, the use of RFID transponders (also known as RF or RFID tags) has grown in prominence as a way to obtain data regarding an object onto which an RF tag is affixed. An RF tag generally includes a memory in which information may be stored. An interrogator containing a transmitter-receiver unit is used to query an RF tag that may be at a distance from the interrogator and moving relative to the interrogator. The RF tag detects the interrogating signal and transmits a response signal containing encoded data back to the interrogator. Such RF tags may have a memory capacity of several kilobytes or more, which is substantially greater than the maximum amount of data that may be contained in a bar code symbol or other types of human-readable indicia. Further, the RF tag memory may be re-written with new or additional data, which would not be possible with a printed bar code symbol. RF tags may also be readable at a distance without requiring a direct line-of-sight view by the interrogator, unlike bar code symbols or other types of human-readable indicia that must be within a direct line-of-sight and which may be rendered entirely unreadable if obscured or damaged. The RF tags may either extract their power from the RF interrogating field provided by the interrogator, or may include their own internal power source (e.g., battery).

More particularly, an RF tag includes a semiconductor chip containing RF circuitry, control logic, and memory. The semiconductor chip may be mounted on a substrate that also includes an antenna. In some applications, RF tags are manufactured by mounting the individual elements to a circuit card made of epoxy-fiberglass composition or ceramic. The antennas are generally loops of wire soldered to the circuit card or consist of metal etched or plated onto the circuit card. The whole assembly may be encapsulated, such as by enclosing the circuit card in a plastic box or molded into a three dimensional plastic package. Recently, thin flexible substrates such as polyamid have been used to reduce the size of the RF tag in order to increase the number and type of applications to which they may be utilized.

With respect to RF tags that draw their power from the interrogating RF field, it is necessary that the antenna connected to the front end of the RF circuitry produce an output voltage that is above a particular threshold voltage. These front end circuits rectify the RF carrier component of the modulated electromagnetic field that excites the antenna, leaving the modulated signal (i.e., envelope) at the output of the front end. To optimize the voltage and/or power produced for the RF tag, there must be a good impedance match between the antenna and the front end of the RF circuitry at the resonance frequency. If the impedance match of the antenna/front end combination is not optimal, the RF tag will have a limited range (i.e., distance) over which it can communicate. There are many known ways to match the antenna and front end impedances, such as impedance matching circuits using discrete components, e.g., inductor/capacitor networks, or distributed elements such as microstrip structures. These known impedance matching techniques are not desirable for many RF applications, however, since they tend to increase the cost, complexity and size of the RF tags.

It is also known to provide the antenna, preferably a dipole antenna, with one or more loading bars that are placed adjacent to the elements of the antenna at a spacing distance. By adjusting the loading bar length, width, and/or spacing distance and/or the number of loading bars, the real part of the antenna input impedance can be changed. Alternatively, one or more stubs may be added to one or more of the antenna elements. The stubs act as two-conductor transmission line that is terminated either in a short-circuit or open-circuit. The short-circuited stub(s) acts as a lumped inductor (capacitor) when the length of the transmission line is within odd (even) multiples of one quarter "guided wavelength" of the transmission line. The guided wavelength has a known relation to the wavelength to which the antenna is tuned. The open-circuited stub(s) acts as a lumped capacitor (inductor) when the length of the transmission line is within odd (even) multiples of one quarter of the guided wavelength. The magnitude of these lumped capacitors and inductors (reactances) is affected not only by the material surrounding the stub, but also is affected by a stub length, a stub conductor width, and a stub conductor spacing. Zero or more short-circuit stubs and zero or more open-circuit stubs are added to one or more of the antenna elements to change the reactive (imaginary) part of the antenna input impedance. The reactive part of the antenna input impedance could be changed to equal the negative magnitude of the reactive part of the front end input impedance. This gives the maximum voltage for a given real part (Ra) of the antenna input impedance and the maximum power transfer between the antenna and the front end.

A drawback with these and other impedance matching techniques for RF tags is that they cannot be adjusted after manufacture to account for minor variations in input impedance that result from manufacturing variations and other factors. The antenna impedance may be affected by the dielectric constant of the substrate material to which the antenna is affixed. Further, the semiconductor chip providing the RFID circuitry may have slight variations in manufacture tolerances that affect the input impedance of the RF front end. These and other factors result in impedance mismatches that reduce the performance of the RF tag. The loading bars and stubs are generally designed for average expected input impedance of the RF circuitry, and cannot be altered after the impedance matching elements are formed on the substrate.

Accordingly, it would be very desirable to provide an RF tag having an antenna that can be adjusted or tuned to achieve optimal performance characteristics.

SUMMARY OF THE INVENTION

The present invention provides an RF tag having an antenna that can be selectively tuned to achieve optimal performance. The tuning can occur during the manufacturing process so that the RFID circuitry has an optimum impedance match with the antenna.

More particularly, the RF tag comprises an RF transponder integrated circuit and an antenna connected to the RF transponder integrated circuit. The antenna includes components such as tuning stubs and loading bars that are physically alterable to selectively vary the performance characteristics of the antenna. The tuning stub and loading bar may each further comprising a variably selectable length having elements that may be removed by punching, cutting, etching, laser trimming or other process. The antenna may further comprise a leadframe or a flexible substrate.

The invention further provides a method of tuning an antenna for an RF transponder. A test signal is sent to an antenna of an initial size and dimension. The strength of a radiated signal received from the antenna is measured, and at least one physical characteristic of the antenna is adjusted. These measuring and adjusting steps may be repeated until optimum strength of the radiated signal is obtained. The antenna further comprises components that are physically alterable to selectively vary performance characteristics of the antenna, and the adjusting step further comprises adjusting dimensions of the physically alterable components. More specifically, the adjusting step further comprises removing a portion of a tuning stub of the antenna in order to alter impedance of the antenna, and/or removing a portion of a loading bar of the antenna in order to alter impedance of the antenna.

In another embodiment of the invention, an apparatus for tuning RF transponders is provided. The tuning apparatus includes a transport mechanism having a supply reel and a take-up reel adapted to transport a tape along a transport path extending therebetween. The tape has a plurality of RF transponder antennas formed thereon. The antennas further comprise respective components that are physically alterable to selectively vary an impedance characteristic of the antennas. A punching tool is disposed on the path between the supply reel and the take-up reel. The punching tool is selectively movable laterally with respect to the tape to execute a punching operation in a portion of the tape corresponding with one of the physically alterable components. Each of the RF transponder antennas of the tape can be adapted to have unique impedance characteristics.

A more complete understanding of the adjustable length antenna system for RF tags will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 3 is an enlarged portion of the adjustable leadframe antenna of FIG. 2 showing an adjustable tuning stub;

FIG. 4 is an enlarged portion of the adjustable leadframe antenna of FIG. 2 showing an adjustable length of the antenna and tuning bars;

FIG. 5 is a plan view of a plurality of RF tag antennas formed on a flexible substrate;

FIG. 6 is an enlarged portion of the flexible substrate of FIG. 5 showing a punch mark used to adjust the antenna length; and FIG. 7 is a perspective view of an apparatus used for selectively punching the flexible substrate of FIG. 5 to adjust antenna characteristics.

DETAILED DESCRIPTION OF THE PREFERRED EMBODIMENT

The present invention satisfies the need for an RF tag having an antenna that can be adjusted or tuned to achieve optimal performance characteristics. In the detailed description that follows, like element numerals are used to describe like elements illustrated in one or more of the figures.

An improvement in RF tag performance can be achieved by fine tuning the antenna for optimal characteristics. This is generally one of the final steps in the fabrication of an RF tag. The goal of fine tuning an antenna is to produce optimized characteristics in the antenna such as the targeted resonant frequency, the targeted antenna impedance, sufficient bandwidth, appropriate gain, and polarization behavior. For antennas such as printed dipoles that can be fine tuned by trimming the antenna lengths, a controlled and repeatable trimming method is crucial in the antenna characteristic optimization process. Every step in the trimming process (e.g., measure, mark and shear) may introduce significant percentage errors when the length to be removed is very small (e.g., 0.1 to 0.5 mm) with respect to the overall antenna length. The present invention provides improved accuracy, repeatability and/or speed of the antenna trimming process.

Figure 1:
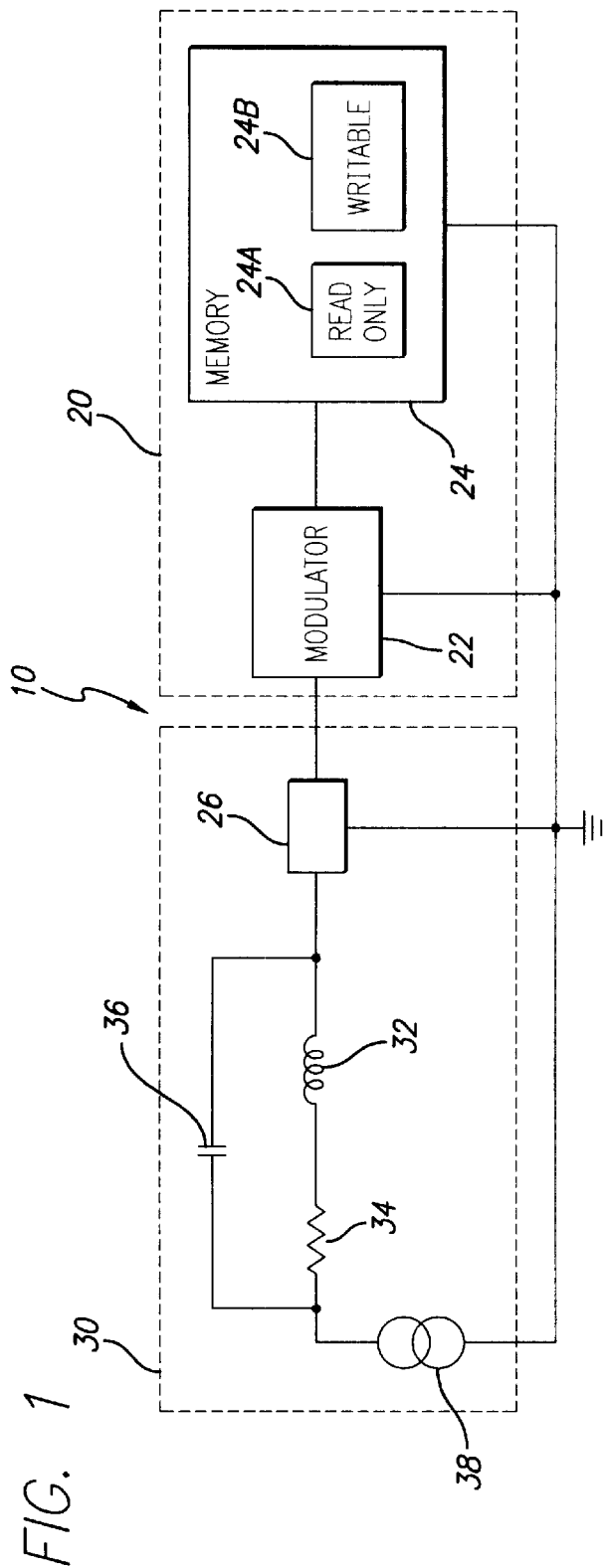
FIG. 1 is an electrical schematic drawing of an exemplary RF tag.

Referring first to FIG. 1, an exemplary circuit schematic of an RF tag 10 is shown. The RF tag 10 includes a transponder circuit 20 and an antenna 30. The transponder circuit 20 further includes a modulator 22 and a memory 24. The modulator 22 provides the function of communicating data signals to and from the antenna 30, and the memory 24 provides the function of storing data. The memory 24 may further include a read-only portion 24A4 that includes data that may not be altered, and a writable portion 24B that may be selectively written-to by a remote interrogator. The transponder circuit may further comprise an RFID transponder, such as disclosed by U.S. Pat. No. 4,786,907, issued Nov. 22, 1998, for "Transponder Useful In A System For Identifying Objects," the subject matter of which is incorporated by reference herein. The antenna 30 generates an alternating voltage from the signal transmitted from an RF interrogator (not shown) represented by a generator 38. A resistor 34 and an inductor 32 in parallel with a capacitor 36 represent the impedance of the antenna 30. An impedance matching section 26 connects the antenna 30 to the transponder circuit 20. The transponder circuit 20 may further comprise a semiconductor circuit chip having conductive pads or connectors that are electrically connected to the antenna 30.

Figure 2:
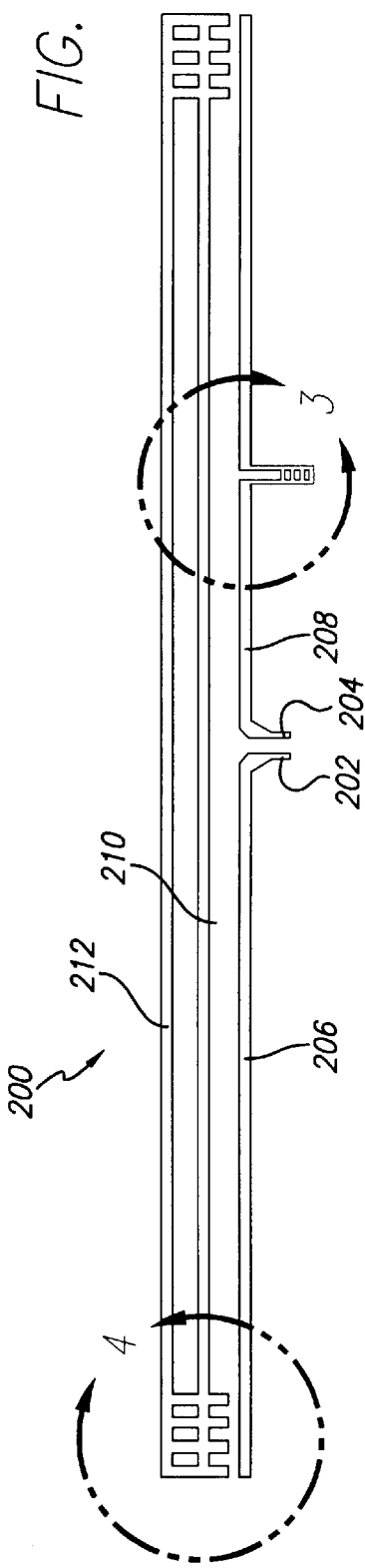
FIG. 2 is a plan view of an adjustable leadframe antenna for an RF tag.

FIG. 2 illustrates an embodiment of the invention in which the antenna is constructed from a leadframe 200. This leadframe antenna 200 is preferably comprised of a material that is electrically conductive and has a degree of stiffness that permits the antenna to flex within a given amount when supported at one or more ends, such as copper, copper-alloys, or nickel-iron alloys such as alloy-42. The leadframe antenna 200 may be formed from a punched and/or etched foil material. The transponder circuit 20 and certain portions of the leadframe antenna 200 are encapsulated, such as using a rigid organic plastic or epoxy molding compound. Connections are made between the leadframe antenna 200 and the transponder circuit 20 using thin wirebonding or other technique providing a fixed mechanical and an electrical connection. The leadframe antenna 200 will have at least connecting points 202, 204 adapted to be electrically attached to the corresponding pads or connectors of the transponder circuit chip.

The leadframe antenna 200 further comprises dipole elements 206, 208 extending linearly in opposite directions from the respective connecting points 202, 204, and loading bars 210, 212 disposed in parallel with the dipole elements 206, 208. A predetermined spacing may be defined between the respective dipole elements 206, 208 and the loading bars 210, 212 (e.g., 0.5 mm, 1.0 mm, 1.5 mm, etc.) While a linear dipole antenna is illustrated, it should be appreciated that other shapes could also be advantageously utilized, such as circular, oval, elliptical, spiral, and the like.

In an embodiment of the invention, the leadframe antenna 200 further includes an adjustable tuning stub 216, as shown in greater detail in FIG. 3. The adjustable tuning stub 216 further comprises extensions 217 and 218 that extend perpendicularly from and are electrically connected to respective ends of a break formed in dipole element 208. The extensions 217, 218 are joined by a plurality of cross couplers 222, 223, 224, 225 that extend in parallel between the extensions 217, 218. The separation spacing between adjacent ones of the cross couplers 222, 223, 224, 225 may be uniform (e.g., 0.25 mm). The length of the adjustable tuning stub 216 may be determined by selectively removing one or more of the cross couplers by cutting, punching, etching, laser trimming, or other known operation, as described in greater detail below. It should be appreciated that the leadframe antenna 200 may further be provided with plural such tuning stubs.

As described above, the tuning stub act as two-conductor transmission line that is terminated either in a short-circuit or open-circuit. The short-circuited stub acts as a lumped inductor (capacitor) when the length of the transmission line is within odd (even) multiples of one quarter "guided wavelength" of the transmission line. The open-circuited stub acts as a lumped capacitor (inductor) when the length of the transmission line is within odd (even) multiples of one quarter of the guided wavelength. The magnitude of these lumped capacitors and inductors (reactances) is related to the length of the stub. Accordingly, the length of the adjustable stub 216 may be tuned by selectively removing one or more of the cross couplers, starting with the proximal cross coupler 222. If all of the cross couplers are removed, the adjustable stub 216 is terminated in an open-circuit; conversely, if any of the cross couplers are remaining, the adjustable stub 216 is terminated in a closed-circuit.

In another embodiment of the invention, the leadframe antenna 200 further includes an adjustable length, as shown in greater detail in FIG. 4. The loading bars 210, 212 further include a first plurality of end couplers 232, 233, 234, 235 extended in parallel therebetween. In addition, a second plurality of end couplers 236, 237, 238, 239 extend between the tuning bar 210 and the dipole element 206. The second plurality of end couplers 236, 237, 238, 239 may not extend entirely between the tuning bar 210 and the dipole element 206, but may define a space therebetween (e.g., 0.25 mm). The first plurality of end couplers 232, 233, 234, 235 may be linearly aligned with respective ones of the second plurality of end couplers 236, 237, 238, 239. The separation spacing between adjacent ones of the end couplers 232, 233, 234, 235 and 236, 237, 238, 239 may be uniform (e.g., 0.5 mm). It should be appreciated that like end couplers are also disposed at the opposite end of the antenna 200 (not shown). As discussed above, by adjusting the loading bar length, the real part of the antenna input impedance could be changed.

Accordingly, the effective length of the loading bar 210, 212 may be tuned by selectively removing one or more of the end couplers, starting with the proximal end couplers 235, 239.

Referring now to FIG. 5, an alternative embodiment of the invention is shown in which a plurality of RF transponders is formed on a flexible substrate. Such flexible substrates may be efficiently manufactured using a roll of flexible tape or film 310 of a laminated organic material such as polyimide, polyester, or the like. In a preferred exemplary embodiment of the process, a polyimide flex tape 310 having linearly arrayed sprocket holes 312 formed along both edges 314 and 316 (i.e., standard 35 mm film) may be used as the transponder substrate material. Polyimide material has an advantageous ability to withstand elevated temperatures that may result from bonding of components and curing of the encapsulant. A metallized pattern is formed on the tape 310 and is comprised of a plurality of antenna circuits 318. The longest dimension of the metallized pattern, and hence the longest dimension (e.g., the length ("L")) of the RF transponder substrates, is oriented to be parallel to the length ("y"-dimension) of the tape 310. It should be appreciated that the antenna circuits 318 formed by metallized patterns can provide a wide variety of antenna circuit configurations or geometries (e.g., dipole, folded dipole, loop, coil, spiral, meander, patch, etc.), depending on the particular requirements of the application in which the RF transponders are to be used. Thus, substitution of one antenna circuit configuration or geometry for another by one of ordinary skill in the art is anticipated and would not depart from the scope and spirit of the invention.

After formation of the antenna circuits 318, radio frequency circuits such as radio frequency transponder circuits 320 are attached to the tape 310. The transponder circuits 320 are electrically connected with respective ones of the antenna circuits 318 via known processes, such as wire bonding, flip-chip attachment processes, or the like. An encapsulant may be deposited over the transponder circuit 320 and the resulting structure cured. If desired, a laminate may be applied to one or both sides of the tape 310 to protect the finished RF transponders from damage due to environmental exposure. The finished RF transponders are then singulated (e.g., punched, sheared or cut) from the tape 310. Alternatively, the tape 310 may be re-rolled to provide an efficient way to store or transport the RF transponders. The finished RF transponders may then be singulated from the tape 310 at a later time.

As described above with respect to the leadframe antennas, the antenna circuits 318 may include impedance adjustment elements, such as loading bars and tuning stubs. As shown in FIG. 5, the antenna circuits comprise dipole elements 322, 324 each having a plurality of tuning stubs 326 extending therefrom and a loading bar 328 disposed in parallel with the dipole elements. A predefined spacing (e.g., 2.5 mm) may be defined between each adjacent one of the tuning stubs 326. It should be appreciated that the number of tuning stubs 326 and spacing between adjacent tuning stubs shown in FIG. 5 are exemplary, and alternative numbers and spacing may be utilized within the spirit and scope of the invention. The impedance of each individual one of the antenna circuits 318 may be tuned by punching out a distal end portion of a selected tuning stub 326. FIG. 6 illustrates a tuning stub 326 in greater detail showing an end region 327 punched out. The punch out transforms the tuning stub 326 from closed-circuit to open-circuit. The particular impedance characteristics of an antenna circuit 318 can be determined by selecting a desired combination of closed-circuit and open-circuit tuning stubs 326. It should also be appreciated that other characteristics of the antenna circuit 318, such as the length of the loading bar 328 or the length of individual tuning stubs 326 can also be selected in a similar manner.

FIG. 7 illustrates an exemplary apparatus used to selectively tune antenna circuits for RF transponders in accordance with the present invention. The tuning apparatus 400 includes a mounting plate 402 secured to a frame assembly 404. The mounting plate 402 supports a supply reel 406 and a take-up reel 408 that are driven by known mechanism, such as motors, pulleys, belts, and the like. A roll of flexible tape or film 310 containing a plurality of antenna circuits may be mounted onto the supply reel 406, as shown in FIG. 7. The tuning apparatus 400 may further include a plurality of guide posts and rollers adapted to control the movement of the tape 310 through a punch assembly 410. The punch assembly 410 may include a punching tool that is movable laterally to a desired position to execute a punching operation in a desired location with respect to an individual antenna circuit, in order to tune the particular antenna circuit as described above. The tuning apparatus 400 may further comprise an automated operation that measures the impedance of the antenna, determines the number and placement of punches in order to achieve a desired impedance, and then controls the movement of the punching tool to execute the desired operation. This automated operation may further comprise an iterative process whereby impedance measurements are made repeatedly as punches are performed.

Fine tuning of an antenna involves dynamically determining an optimum antenna dimension based on the relative strength of a radiated signal received from the antenna. Dynamic adjustment of an antenna dimension involves the following steps: (1) sending a test signal to an antenna of an initial size and dimension; (2) measuring the strength of the radiated signal received from the antenna; (3) adjusting a dimension of the antenna, and again measuring the strength of the radiated signal received from the antenna. The steps may be repeated until substantially optimal antenna characteristics are obtained.

More particularly, the antenna to be adjusted generally begins with dimensions somewhat greater than optimum for a given application. The test signal applied to the antenna has a predetermined frequency or range of frequencies according to the application, has a standardized signal strength, and is applied to the antenna in a standardized manner. If the antenna can function to back scatter the incident radiation, the test signal may be radiated. The strength of the signal radiated or reflected from the antenna is measured against predetermined criteria. If the antenna characteristics are not optimal, a small portion of the antenna may be removed. For example, the length of the antenna may be altered, or the length of one or more loading bars may be altered, or the length and/or other characteristics of a tuning stub may be altered. The steps are then repeated and the antenna characteristics based on further measurements are compared with the previous test results. Computer algorithms may be used to hasten the process, such as by selecting an optimal antenna dimension to alter as a function of the signal received.

In an alternative embodiment of the invention, laser trimming of the antenna dimensions may be utilized instead of cutting or punching. Very short, sub-nanosecond laser pulses may be used to cut highly reflecting metal lines, such as copper lines. Laser trimming may also be used to remove dielectric material from positions adjacent to the antenna. By lowering the effective dielectric constant of the antenna surroundings, the effective length of the antenna can be shortened.

Dynamic adjustment of the antenna dimensions may take place at any stage in the production of an RF tag. For instance, dynamic adjustment might occur before or after the antenna is attached to the transponder circuit, or after the transponder circuit is encapsulated. Preferably, dynamic adjustment occurs as one of the final steps in fabrication of an RF tag, and may be part of a mass production of one or more types of transponder systems. Dynamic adjustment may further be used to improve the performance of any antenna whose operational characteristics vary as a function of its size. By way of example, and not of limitation, the antennas shown at 230 in FIG. 10 of copending application Ser. No. 09/313,236, at FIGS. 1, 2 and 8 of U.S. Pat. No. 5,682,143, or at FIGS. 5, 6, 7, 8A, 8B or 8C of U.S. Pat. No. 5,786,626, are offered as potential antennas capable of adjustment in accordance with the invention. These patents and patent applications are incorporated by reference herein. If an RF transponder is to be used with an adhesive label, the antenna may be trimmed so that a proper impedance match between the antenna and the transponder circuit is obtained when the adhesive label is affixed to a particular type of substrate material, as disclosed in U.S. Pat. No. 6,121,880, incorporated by reference herein.

Having thus described a preferred embodiment of an adjustable length antenna system for RF tags it should be apparent to those skilled in the art that certain advantages of the described system have been achieved. It should also be appreciated that various modifications, adaptations, and alternative embodiments thereof may be made within the scope and spirit of the present invention. The invention is further defined by the following claims.

What is claimed is:

1. An RF transponder, comprising:
   an RF transponder integrated circuit; and
   an antenna connected to said RF transponder integrated circuit, said antenna having components that are physically alterable to change dimensions of said antenna to selectively vary performance characteristics of said antenna.

2. The RF transponder of claim 1, wherein said components comprise tuning stubs having removable elements.

3. The RF transponder of claim 1, wherein said antenna components comprise loading bars having removable elements.

4. The RF transponder of claim 1, wherein said antenna further comprises a leadframe.

5. The RF transponder of claim 1, wherein said antenna further comprises a flexible substrate.

6. An RF transponder, comprising:
   an RF transponder integrated circuit; and
   a dipole antenna connected to said RF transponder integrated circuit, said antenna having a tuning stub coupled to a dipole element of said dipole antenna and a loading bar spaced from said dipole antenna, said tuning stub and said loading bar each further comprising a variably selectable length;
   wherein, an impedance characteristic of said dipole antenna is defined in part of said variably selectable lengths of said tuning stub and said loading bar.

7. The RF transponder of claim 6, wherein said tuning stub further comprises plural removable elements defining respective lengths of said tuning stub.

8. The RF transponder of claim 7, wherein said tuning stub is further adaptable to provide one of an open-circuit and a closed-circuit configuration.

9. The RF transponder of claim 6, wherein said loading bar further comprises plural removable elements defining respective lengths of said loading bar.

10. The RF transponder of claim 6, wherein said dipole antenna further comprises a leadframe.

11. The RF transponder of claim 6, wherein said dipole antenna further comprises a flexible substrate.

12. A method of tuning an antenna for an RF transponder, comprising:

sending a test signal to an antenna of an initial size and dimension;

measuring the strength of a radiated signal received from the antenna;

adjusting at least one physical characteristic of the antenna; and repeating said measuring and adjusting steps until optimum strength of the radiated signal is obtained.

13. A method of tuning an antenna for an RF transponder, comprising:

sending a test signal to an antenna of an initial size and dimension;

measuring the strength of a radiated signal received from the antenna;

adjusting at least one physical characteristic of the antenna; and repeating said measuring and adjusting steps until optimum strength of the radiated signal is obtained;

wherein said antenna further comprises components that are physically alterable to selectively vary performance characteristics of said antenna, and said adjusting step further comprises adjusting dimensions of said physically alterable components.

14. A method of tuning an antenna for an RF transponder, comprising:

sending a test signal to an antenna of an initial size and dimension;

measuring the strength of a radiated signal received from the antenna;

adjusting at least one physical characteristic of the antenna; and repeating said measuring and adjusting steps until optimum strength of the radiated signal is obtained;

wherein said adjusting step further comprises removing a portion of a tuning stub of said antenna in order to alter impedance of said antenna.

15. A method of tuning an antenna for an RF transponder, comprising:

sending a test signal to an antenna of an initial size and dimension;

measuring the strength of a radiated signal received from the antenna;

adjusting at least one physical characteristic of the antenna; and repeating said measuring and adjusting steps until optimum strength of the radiated signal is obtained;

wherein said adjusting step further comprises removing a portion of a loading bar of said antenna in order to alter impedance of said antenna.

16. An apparatus for tuning RF transponders, comprising:

a transport mechanism including a supply reel and a take-up reel adapted to transport a tape along a transport path extending therebetween, said tape having a plurality of RF transponder antennas formed thereon, said antennas further comprising respective components that are physically alterable to selectively vary an impedance characteristic of said antennas; and a punching tool disposed on said path between said supply reel and said take-up reel, said punching tool being selectively movable laterally with respect to said tape to execute a punching operation in a portion of said tape corresponding with one of said physically alterable components;

wherein each of said RF transponder antennas of said tape can be adapted to have unique impedance characteristics.

17. The apparatus of claim 16, further comprising means for measuring impedance of said antennas.

18. The apparatus of claim 16, further comprising means for determining the placement of said punching tool with respect to said tape.

19. The apparatus of claim 16, further comprising means for controlling the movement of said punching tool to execute said punching operation.

\* \* \* \* \*